April 19, 1927.
H. PAPST
1,625,051
SUPPORTING HOUSING FOR ELECTRIC MACHINES WITH SPLIT POLES
Filed May 25, 1926    2 Sheets-Sheet 1
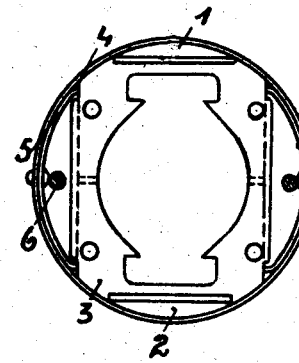
Fig.1
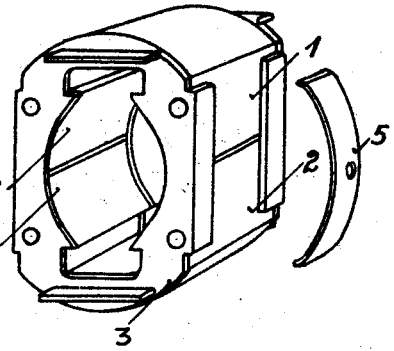
Fig.2
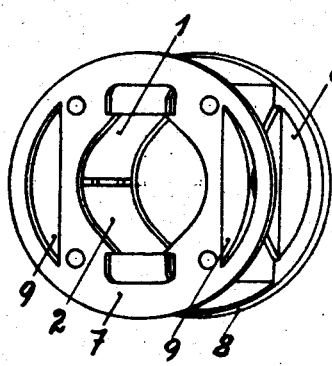
Fig.3
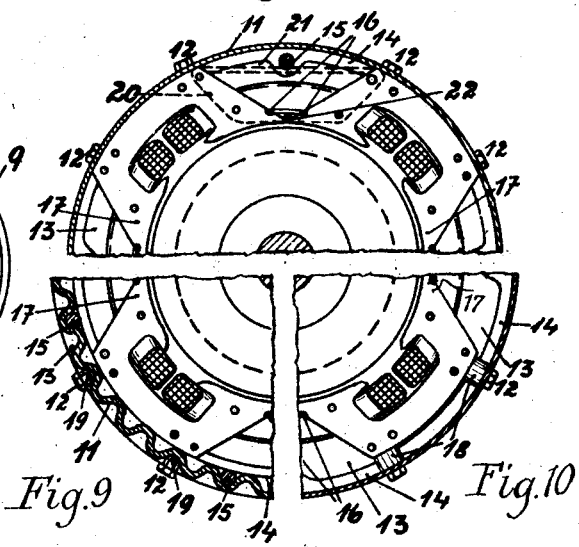
Fig.4
Fig.9    Fig.10
Inventor
Hermann Papst
by Ernest D. Jansen
Atty.

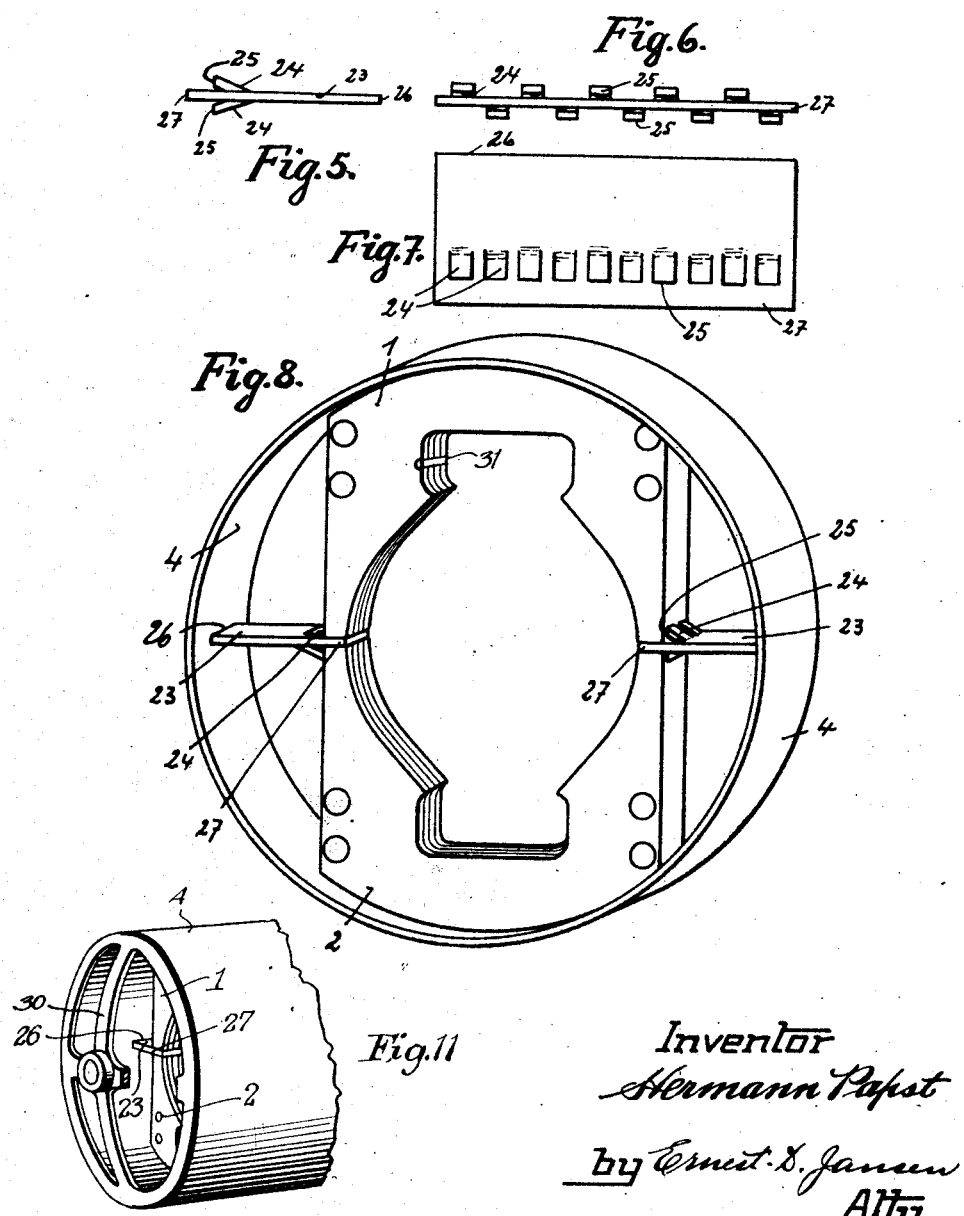

Patented Apr. 19, 1927.

1,625,051

UNITED STATES PATENT OFFICE.

HERMANN PAPST, OF VIENNA, AUSTRIA, ASSIGNOR, BY MESNE ASSIGNMENTS, TO FRANCIS B. KEANE, OF BRIDGEPORT, CONNECTICUT.

SUPPORTING HOUSING FOR ELECTRIC MACHINES WITH SPLIT POLES.

Application filed May 25, 1926, Serial No. 111,588, and in Austria March 11, 1925.

My invention relates to improvements in supporting housings for electrical machines with split poles. The arrangement of split poles, particularly in conjunction with certain pole shapes, enables the weight of the machines to be kept very low provided it is possible to compensate in an economical manner the natural strength of the magnet frame lost in splitting the poles. This is one of the vital questions for the existence of the split pole machine.

My invention consists essentially in the provision of a shell of thin sheet metal as supporting housing for electrical machines with split poles, the exact shape and configuration being produced by the bearing shields after assembly.

An ordinary cast frame such as is employed with most types of present machines possesses considerable weight because of the large amount of material necessary to provide a given strength. To overcome this disadvantage of weight and yet not sacrifice strength, I may arrange small two pole machines in a cylindrical sheet metal shell and then center the poles by the insertion of various forms of bracing members. These bracing members may contact with the entire inner circumference of the shell or they may contact with only a portion. The choice of one form or the other is substantially arbitrary, although each form has particular advantages when assembling costs as well as manufacturing costs are considered. In any event, the shell and bracing members are made of sheet metal and no castings are needed throughout the supporting housing.

Various other features of my invention relate to specific details of construction of supporting housings for electric machines with split poles whereby structural advantages are obtained.

In the drawing affixed to my specification and forming part thereof a number of embodiments of my invention are shown by way of example. In the drawing:

Fig. 1 shows the improved supporting housing and the magnet frame of a two pole machine in front elevation.

Fig. 2 shows the same parts of the machine in perspective view with the sheet metal shell removed, Fig. 3 is a similar view to Fig. 2 of a modified design of the supporting structure, Fig. 4 shows the application of the invention to a four pole machine shown in cross-section, Figs. 5, 6 and 7 show side and front elevation and plan views of an insertion member for supporting the pole pieces in relation to the shell, Fig. 8 shows a two-pole frame with the supporting members of Fig. 5 in position.

Fig. 9 is a quarter cross-sectional view of a machine provided with a corrugated shell.

Fig. 10 is a quarter cross-sectional view of a machine provided with corrugated non-magnetic spacing washers.

Fig. 11 is a perspective view showing the end shield in place at the end of the machine.

Referring to Figs. 1 and 2, it will be seen that the laminated pole pieces 1, 2 are clamped together at their front faces by riveted plates 3 which are turned over at their edges in order to increase their strength. The pole pieces are surrounded by a thin sheet metal shell 4 which at the part free from the pole pieces is stiffened by sheet metal strips 5 connected with the shell in any suitable manner to press against the pole pieces 1, 2 and centre them. The bearing shields not illustrated in this figure, but shown at 30 in Fig. 11, give the shell 4 an accurate circular shape and ample strength owing to their closely fitting flanges, the sheet metal shell serving as intermediate support for the pole pieces. The screws 6 holding the bearing shields together are located in the space between the pole pieces 1, 2 and the mantle 4 since the shell itself is not sufficiently strong that screw thread may be cut into it. The space remaining between the pole pieces and the shell serves furthermore for housing the switches, plugs and the like and ensures effective cooling of the machine. The pole pieces may equally well be connected separately with the sheet metal shell. In order to avoid the necessity of cutting screw thread into the pole pieces they may be fixed to the shell by point welding or soldering.

In the modified design illustrated in Fig. 3, the plates 7, 8 arranged at the front sides of the pole pieces 1, 2 are made of circular shape so that they abut against the shell with their entire circumference. In this manner the centering segments 5 of the just described construction are rendered unnecessary. In the plates 7, 8 opening 9 for cooling purposes are provided, the punched out tongues 10 for producing these openings being turned over and serving for stiffening the structure. If sheet iron is employed for the shell, the sheets are preferably made of a slightly larger diameter than the magnet frame in order to break the magnetic continuity.

Fig. 4 shows a four pole machine in which the pole pieces 17 are again enveloped by a thin sheet metal shell 11. The bearing shields 13 abut with their fitting edges 14 against the shell 11 and are secured together by screw bolts 15 located inside the shell 11. In order to avoid riveting the laminations forming the pole pieces they are prevented from mutual displacement by welded seams 16 which method may with advantage also be employed for other machines. In order to render the machine capable of withstanding rough usage the pole pieces 17 may at the front ends be secured together and against rotation by sheet metal plates 20 indicated in broken lines. To prevent bending of these plates they are turned over along their edges 21. These reinforcing plates may closely fit the shell to prevent them from being dented. The strength of the structure is furthermore considerably increased without an expenditure of materials hardly worth mentioning if the pole pieces 17 in the pole gaps are joined at 22 by hard soldering. If sheet iron is employed it is preferable to insulate the poles from the shell by interposition of non-magnetic members, as shown at 18 in Fig. 10. In order to reduce the quantity of the material required for this purpose corrugated sheet metal is employed which is placed around the screws 12, the corrugations allowing a close adaptation around the curved surfaces. To prevent denting of the thin shell 11 it may be formed of corrugated metal as shown in Fig. 9. The convolutions add considerable strength to the finished machine and the means which I employ for securing the pole pieces in place accurately space the pole pieces about the circumference of the shell. The screws 12 are here provided with U-shaped packing pieces 19. The screw bolts 15 are located in the corrugations of the sheet metal shell so that the pole pieces 17 are accurately spaced around a circle. The radiation surface is in this manner advantageously increased and the shell effectively safe-guarded against becoming dented.

In Figs. 5 to 8 means are illustrated to support the pole pieces in correct relation to the shell and conversely to stiffen the shell upon the pole pieces. For this purpose tongues or flaps 24 and 25 are punched out of a piece of non-magnetic sheet metal 23 at some distance from the inner edge and alternately bent to one or the other side out of the plane of the piece 23. The prongs thus formed abut with their front faces 25 against the pole pieces 1 and 2 while the outer ends 26 of the pieces 23 abut against the shell 4. Each piece 23 has thus a central part 27 which extends beyond the prongs 24 and 25 and enters and completely fills up the pole gap and thus keeps the pole pieces apart at the correct distance. In Fig. 8 a two pole frame is illustrated the pole pieces 1 and 2 of which are securely held in position by tension and pressure of the supporting pieces 23, 24, 25, 26 and 27 and the sheet metal shell 4.

The pole structure shown in Fig. 8 may be composed of laminations which are securely held together by a welded seam 31, as hereinbefore described in connection with Fig. 4.

In Fig. 11 I have shown a perspective view of one end of the machine embodying the invention disclosed in Fig. 8. The bearing shield 30, shown in this figure supports the central shaft which passes through the machine and also strengthens the shell 4 and assists in holding it in accurate circular shape.

Various modifications and changes may be made without departing from the spirit and scope of the invention. I desire, therefore, that only such limitations shall be placed thereon as are imposed by the prior art and the appended claims.

I claim as my invention:

1. The combination with a dynamo electric machine having a field structure comprising a plurality of polar projections, of a supporting housing comprising a thin sheet metal shell adapted to encircle said field structure, bearing shields arranged at each end of said shell and adapted to shape and support said shell, and spacing and reinforcing members associated with said poles and contacting with said shell to rigidly position said structure in said shell.

2. The combination with a split pole dynamo electric machine having a field structure comprising a plurality of split polar projections separated by pole gaps, of a supporting housing comprising a thin sheet metal shell encircling said structure and supporting it, bearing shields arranged at each end of said shell and adapted to shape and support said shell, and spacing and reinforcing members associated with said polar projections and contacting with said shell between said projections to rigidly position said structure in said shell.

3. The combination with a split pole dynamo electric machine having a field structure comprising a plurality of split polar projections separated by pole gaps, of a supporting housing comprising a thin sheet metal shell encircling said structure and supporting it, bearing shields arranged at each end of said shell and adapted to shape and support said shell, and spacing and reinforcing members associated with adjacent faces of said polar projection and contacting with said shell between said projections to rigidly position said structure in said shell.

4. The combination with a split pole dynamo electric machine having a field structure comprising a plurality of split polar projections separated by pole gaps, of a supporting housing comprising a thin sheet metal shell encircling said structure, bearing shields arranged at each end of said shell and adapted to shape and support said shell, and spacing and reinforcing members extending into said pole gaps and contacting with said shell between said polar projections, said members having portions contacting with said projections on each side of said gaps, whereby said structure is rigidly positioned in said shell.

5. The combination with a split pole dynamo electric machine having a field structure comprising a plurality of split polar projections separated by pole gaps, a supporting housing, a member for reinforcing and maintaining the pole pieces in spaced relation to said housing, said member having a plurality of lugs struck therefrom and alternately projecting from either face thereof and a flat portion beyond said lugs, said flat portion being disposed between the pole faces and the lugs bearing against the adjacent faces of the poles.

6. The combination with a split pole dynamo electric machine having a field structure comprising a plurality of split polar projections separated by pole gaps, said polar projections having at least one welded seam extending across their surfaces on each side of said gaps, of a supporting housing comprising a thin sheet metal shell encircling said structure, bearing shields arranged at each end of said shell and adapted to shape and support said shell, and spacing and reinforcing members associated with said polar projections and contacting with said shell between said projections to rigidly position said structure in said shell.

In testimony whereof I affix my signature.

HERMANN PAPST.